Patented July 21, 1942

2,290,411

UNITED STATES PATENT OFFICE 2,290,411

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 27, 1940,
Serial No. 342,721

10 Claims. (Cl. 252—341)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The demulsifier or demulsifying agent employed in our process, consists of a compound or mixture of compounds that comprises the acylation product of a high molecular weight carboxy acid and a hydroxylated diamine, said compound or mixture of compounds being characterized by the presence of a certain type of acyl radical in the acylated compound, as hereinafter described. The acid radical may be derived from any suitable high molecular weight carboxy acid. In order that our invention may be clearly understood, we will hereinafter give several examples of chemical compounds suitable for use in practising our process, and we will explain how said compounds can be produced or obtained. Some of the compounds herein described, in addition to being unusually effective as demulsifiers for water-in-oil emulsions, are also adapted for other purposes or uses, such, for example, as (a) a break inducer in doctor treatment of the kind intended to sweeten gasoline. See U. S. Patent No. 2,157,223, to Sutton, dated May 9, 1939; (b) as surface tension depressants in the acidization of calcareous oil-bearing strata by means of hydrochloric acid or other strong mineral acid, as described in our co-pending applications for patent Serial Numbers 322,537 and 322,538, filed March 6, 1940, and Serial No. 323,418, filed March 11, 1940, by Melvin De Groote and Bernhard Keiser which have matured into Patents 2,281,419 dated April 28, 1942, 2,233,383, dated February 25, 1941, and 2,278,838, dated April 7, 1942; and (c) as surface tension depressants or wetting agents in the flooding of subterranean oil-bearing strata to recover oil from same, as described in our co-pending applications for patent Serial Numbers 322,534, 322,535 and 322,536, filed March 6, 1940, by Melvin De Groote and Bernhard Keiser which have matured into Patents 2,233,381 and 2,233,382, dated February 25, 1941, and 2,226,119, dated December 24, 1940.

The expression "higher molecular weight carboxy acids" is an expression frequently employed to refer to certain organic acids, particularly monocarboxy acids, having more than six carbon atoms and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils, such as those mentioned; hydroxy and alpha-hydroxy higher carboxylic, aliphatic and fatty acids, such as dihydroxystearic acid, dihydroxy palmitic acid, dihydroxy-behenic acid, alpha-hydroxy capric acid, alpha-hydroxystearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as benzoic acid, Twitchell fatty acids, naphthoic acid, carboxydiphenyl pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

In some instances, obviously certain derivatives of dibasic acids would, in essence, act as if they were simple monocarboxylated acids, for instance, various phthalmic acids derived from phthalic anhydride, and amines, such as aniline, cyclohexylamine, octylamine, etc. Other similar amido acids can be derived by means of other comparable anhydrides. One may also employ materials such as ethyl ricinoleate monophthalate, etc., and also various acids which are derived from chloracetyl ricinoleic acid and its analogs, by replacing a chlorine atom with a suitable monovalent hydrocarbon or an oxyhydrocarbon radical.

Another source of suitable acids are those commonly referred to as lac acids, such as for example, the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy, chloro-, keto-, and amino- derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc. or estolides derived from blown oils, such as blown castor oil, blown soyabean oil, etc.

Hydroxylated diamines are available commercially and can be prepared by well known methods. It is well known that olefine dichlorides, particularly those containing from two to 10 carbon atoms, may be reacted with ammonia or amines to give alkylene diamines, the simplest one being ethylene diamine. If, instead of using ethylene dichloride, the corresponding propylene, butylene, amylene, or higher molecular weight chlorides are used, one then obtains the comparable homologues. Such diamines may be alkylated in the manner commonly employed for alkylating ordinary amines, i. e., monoamines. Alkylation may result in products which are symmetrically or non-symmetrically alkylated. The symmetrically alkylated diamines are most readily obtainable. For instance, alkylated products may be derived by reaction between alkyl chlorides, such as propyl chloride, butyl chloride, amyl chloride, cetyl chloride, and the like. Such reaction products result in the formation of hydrochloric acid, and the resultant product consists of an amine hydrochloride. The conventional method for conversion into the base is to treat with dilute caustic solution. Alkylation is not limited to the introduction of an alkyl group; but as a matter of fact, a radical may be introduced characterized by the fact that the carbon atom chain is interrupted at least once by an oxygen atom. In other words, alkylation may be accomplished by compounds which are essentially alkyoxyalkyl chlorides, as, for example, the following:

It is to be noted that the present compounds are characterized by being derivatives of hydroxylated diamines; i. e., there must be one hydroxylated hydrocarbon or hydroxylated oxyhydrocarbon radical in an amino hydrogen atom position. However, as will be subsequently shown, such acylated products may be derived from nonhydroxylated diamines. Generally speaking, such hydroxylated derivatives are obtained in various ways. They may be obtained by introducing hydroxylated hydrocarbon or hydroxylated oxyhydrocarbon radicals into a non-alkylated diamine. Similarly, they may be obtained by introducing the same kind of radical into an alkylated diamine characterized by the presence of at least one amino hydrogen atom. They may be obtained by introducing a radical of the kind described into a non-alkylated diamine and subsequently alkylating the diamine.

As a matter of fact, reactions involving ammonia and an alkylene dichloride probably go through an intermediate stage which involves the formation of an amino alkyl halide. As a result, one has another suitable procedure for manufacture of the diamines, i. e., a reaction involving amino alkyl halides and a monoamine. See British Patent No. 292,615, to I. G. Farbenindustrie A.-G., application date in the United Kingdom June 22, 1928.

As has been previously stated, the reaction involving the alkylene dichlorides is not limited to ammonia, but may involve amines, such as ethylamine, propylamine, butylamine, octylamine, decylamine, cetylamine, dodecylamine, etc. Similarly, the reaction may involve the comparable secondary amines, in which various alkyl radicals previously mentioned appear twice and are types in which two dissimilar radicals appear, for instance, amyl butylamine, hexyl octylamine, etc. Furthermore, compounds may be derived by reactions involving alkylene dichlorides and a mixture of ammonia and amines, or a mixture of two different amines. However, as will be indicated subsequently in greater detail, one need not employ a diamine having an alkyl radical. For instance, any suitable polyalkylene diamine, such as ethylene diamine, propylene diamine, etc., may be treated with ethylene oxide or similar oxyalkylating agent. Furthermore, various amines, such as diethanolamine, dipropanolamine, and the like, may be treated with a suitable alkylene dichloride, such as ethylene dichloride, propylene dichloride, etc.

As to the introduction of a hydroxylated group, one can use any one of a number of well known procedures. Alkylation may involve a chlorhydrin, such as ethylene chlorhydrin, glycerol chlorhydrin, or the like. Such reactions are entirely comparable to the alkylation reaction involving alkyl chlorides previously described. Other reactions may involve the use of an alkylene oxide, such as ethylene oxide, propylene oxide, butylene oxide, or the like. Glycid may be employed. The type of reaction just referred to is well known and results in the introduction of a hydroxylated or polyhydroxylated radical in an amino hydrogen position. It is also possible to introduce a hydroxylated oxyhydrocarbon atom; for instance, instead of using the chlorhydrin corresponding to ethylene glycol, one may use the chlorhydrin corresponding to diethylene glycol. Similarly, instead of using the chlorhydrin corresponding to glycerol, one may use the chlorhydrin corresponding to diglycerol.

In view of what has been said, it is obvious that one can obtain hydroxylated diamines of the following composition:

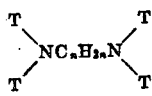

in which T may be a hydrogen atom, an alkyl radical, an alkyloxy-alkyl radical, a hydroxylated alkyl radical, or a hydroxylated alkyl-oxy-alkyl radical, with the proviso that at least one occurrence of T be of the hydroxylated type, and $n$ is a small whole number greater than one and preferably not over ten.

Having selected a suitable hydroxylated diamine of the kind just described, one employs a high molecular weight carboxy acid, or its functional equivalent of the kind previously described, in such a manner as to produce an acylated product. Of the various high molecular weight carboxy acids described, it is our preference to employ a detergent-forming type of acid, and more particularly, a fatty acid type. Of the various fatty acids, we prefer to use ricinoleic acid; and it is most suitably employed in its most readily obtainable form, i. e., as the ester, triricinolein.

One mole of castor oil is heated with three moles of a selected hydroxylated diamine, for instance, hydroxyethyl ethylene diamine, at approximately 140–180° C., for several hours with constant stirring, until the resultant product is entirely soluble in hydrochloric acid of any convenient strength, for instance, 25% strength. Similarly, the product should show solubility in dilute acetic acid, for instance, 5–10% acetic acid.

The product so obtained is characterized by the presence of at least one acyl radical for each diamino radical. However, the acyl radical may by present either in the amido form, or in the ester form. Using hydroxyethyl ethylene diamine purely as a matter of illustration, and indicating the ricinoleyl radical by R.CO, the two types of compounds obtained may be indicated by the following formulas:

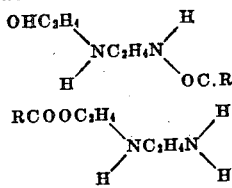

In the above formulas no effort has been made to indicate the particular isomer. One isomeric form is just as suitable as another. For instance, in the first formula it is entirely possible that the acyl radical is attached to the same amino nitrogen atom to which the hydroxy hydrocarbon group is attached. However, it is obvious that if the reaction previously described is repeated, employing two moles of triricinolein and three moles of hydroxyethyl ethylene diamine, one may obtain an acylation product which is in essence a combination of the two above described and may be indicated by the following formula:

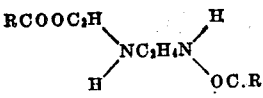

Here again no effort is made to differentiate between isomeric forms. The first type, for convenience, will be referred to as the amide type, the second type as the ester type, and the third type as the amido ester type.

It is well known that in the case of ordinary amines, i. e., monoamines, vigorous acylation reactions may produce secondary amides, as distinguished from ordinary amides, which are primary amides. In other words, these two types may be indicated thus:

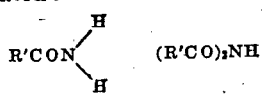

R'CO indicating any suitable acyl radical.

Similarly, vigorous acylating agents, particularly acyl chlorides, may produce secondary amides; or one may have present two hydroxyhydrocarbon radicals, and thus obtain acylated derivatives in which there are two ester radicals present; for instance, compounds obtained from bis(hydroxyethyl)ethylene diamine. The method of obtaining acylation derivatives from hydroxylated diamines is the conventional procedure commonly employed in analogous reactions. For instance, a high molecular weight carboxy acid or a functional equivalent of the kind described is reacted in predetermined molecular ratios with a suitable hydroxy diamine and the reaction conducted at any suitable temperature, for instance, 140–200°, for any suitable length of time, such as 2–6 hours, until acylation is complete. Completeness of acylation can be determined in any suitable manner and is usually indicated, at least approximately, by solubility in acid, as previously described.

In the manufacture of compounds of the kind contemplated, particularly when it is intended that they should be used as demulsifiers, it is unnecessary, in the majority of instances, to make any particular effort to obtain one type of acylation product or another. Usually, the mixture is entirely satisfactory. If, however, one desires a particular type, this can be readily obtained in a manner which is obvious. For instance, symmetrically butylated ethylene diamine may be treated with two molecules of ethylene oxide, so as to yield a diamine of the following composition:

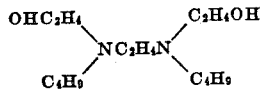

The acylation of such hydroxylated diamine can result only in the formation of an ester type, insofar that there are no replaceable amino hydrogen atoms. Similarly, if a compound such as hydroxyethyl ethylene diamine is acylated with two moles of a selected carboxy acid or its functional equivalent, then one obtains a mixed type compound, i. e., one containing both the ester linkage and the amide linkage, with each being attached to different nitrogen atoms. The reason for the formation of this particular type compound is that under circumstances where two acyl groups can add, hypothetically, at least, so as to be linked to the same nitrogen atom or to two different nitrogen atoms, one obtains the compound in which the acyl groups are attached to different nitrogen atoms. Thus, under such circumstances one obtains neither a secondary amide nor an ester amide of the type which involves only one nitrogen atom, but does obtain the ester amide type involving two nitrogen atoms.

In view of what has been said, it at once appears that it would be somewhat difficult to prepare the amide type and permit the hydroxylated radical to remain intact. However, certain types of reactions yield such a product. For instance, if, instead of the high molecular weight acid, one uses the amide, then the reaction, particularly with a diamino compound containing a primary amine radical, is apt to result in the formation of an amide of the diamine with the hydroxylated group substantially intact. This may be indicated by the following reaction:

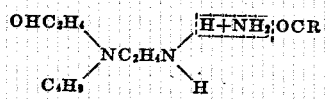

As to the manufacture of acylated derivatives from a hydroxy-alkylamine, as has been previously stated, the method of making an acylated product of the kind previously described is well known. For example, see British Patent No. 306,116, to I. G. Farbenindustrie A.-G., dated May 29, 1930. See also British Patent No. 364,104, to I. G. Farbenindustrie A.-G., dated 1932, and particularly, Example 1 of this patent.

Attention is directed to the fact that the word "amidification" has been applied to the reaction involving the replacement of an amino hydrogen atom by an acyl radical, without conventional limitation to a reaction involving ammonia. The replacement of the amino hydrogen atom of a primary amine or a secondary amine by an acyl radical has been considered as being amidification, rather than the formation of a substituted amide, or the formation of an imide or substituted imide. Such obvious departure from conventional nomenclatures has been for purposes of simplicity and to show the similarity between certain reactions.

As has been previously pointed out, it is necessary that there be present an acyl radical derived from a higher molecular weight carboxy acid. This is not intended to exclude the presence of an acyl radical derived from a lower molecular weight acid, such as acetic acid, butyric acid, or the like. The acyl radicals from such lower molecular weight acids are introduced in the same comparable manner employed to introduce acyl radicals from higher molecular weight acids. Acetic anhydride is particularly desirable as an acylating agent, if one is interested in introducing an acetyl radical. Generally speaking, however, the introduction of such lower molecular weight acyl radicals does not increase the effectiveness of the compound as a demulsifier and only increases its cost of manufacture.

Previously, methods have been suggested for obtaining a particular type of acylation product, i. e., the ester type or the amide type, or the combined type. Attention is directed to another procedure which may be employed to convert the amide type into an ester type, at least in certain instances. The method is used primarily in connection with derivatives of monoamines, but can be used at times in connection with acylated derivatives of diamines. The method depends on the conversion of the amide type into an ester type in the presence of an acid, such as 85% lactic acid. See U. S. Patent No. 2,151,788, to Mauersberger, dated March 28, 1939.

It has been previously indicated that, although the derivatives herein described may be considered as acylation products of hydroxylated diamines, yet they need not necessarily be derived from hydroxylated diamines, or from any hydroxylated amine. They may be derived by the hydroxylation of an acylated amide, particularly an acylated diamine, i. e., an amide derivative of a diamine. The manufacture of amido derivatives of diamines is well known. See U. S. Patent No. 1,534,525, dated April 21, 1925, to Hartmann and Kagi.

Such non-hydroxylated compound can be converted into a hydroxylated compound by a reaction with an oxy-alkylating agent, such as ethylene oxide, propylene oxide, glycidol, or the various reagents of this type previously described. As to the general procedure for converting the amide derived from a polyamine into the hydroxylated compound, see U. S. Patent No. 1,924,698, dated August 29, 1933, to Neelmeier et al. In the formation of hydroxylated compounds one uses suitable molecular proportions of ethylene oxide or the like, so as to obtain the hydroxylated derivative, rather than the type characterized by a polymerized ethylene oxide group, particularly having four or more ethoxy linkages.

Demulsifiers or demulsifying agents suitable for use in practising our process may be produced by the following procedure:

*Example 1*

Three molecular proportions of hydroxyethyl ethylene diamine are treated with one molecular proportion of castor oil (triricinolein) at a temperature of approximately 160–190° C. for about 2–6 hours until acylation is substantially complete.

*Example 2*

Hydroxyethyl propylene diamine is substituted for hydroxyethyl ethylene diamine in Example 1.

*Example 3*

Bis (hydroxyethyl) ethylene diamine is treated with ricinoleic acid in the molar proportion of three moles of ricinoleic acid to one mole of the diamine.

*Example 4*

100 parts of olive oil are slowly heated to 180° C. with 48 parts of tetrahydroxyethyl ethylene diamine monohydroxyethyl ether, obtainable by the treatment of 1 molecular proportion of ethylene diamine with five molecular proportions of ethylene oxide and corresponding to the formula:

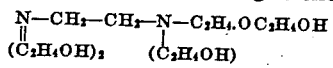

until an acidified sample of the reaction mixture is soluble in water.

*Example 5*

Hydroxyethyl ethylene diamine is heated at about 130–150° C. with a molar proportion of the amide of oleic acid.

Example 6

The same procedure is followed as in Example 5, except that the amide is derived from purified Gulf Coast naphthenic acids.

Example 7

One molecular proportion of hydroxyethyl ethylene diamine is acylated with two moles of abietic acid.

Example 8

The abietic acid employed in the previous example is replaced by a mixture of acids obtained by oxidation of petroleum hydrocarbons and characterized by consisting of a mixture of straight and branched chain carboxy acids averaging approximately 9-14 carbon atoms.

Example 9

Unsymmetrical dibutyl ethylene diamine of the following constitution:

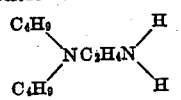

is treated with two moles of ethylene oxide to give dibutyl dihydroxyethyl ethylene diamine of the following composition:

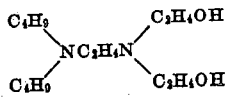

The product so obtained is acylated by using stearic acid in equal molecular amounts.

Example 10

The same procedure is followed as in the preceding example, except that the product is acylated by employing one mole of stearic acid and one mole of acetic acid for each mole of the amine employed.

Example 11

Distearyl ethylene diamide is treated with one mole of ethylene oxide to give hydroxyethyl distearyl ethylene diamine, or, as it is sometimes referred to, hydroxyethyl distearyl ethylene diamide. (As to the manufacture of the stearic acid derivative see U. S. Patent No. 1,534,525, previously mentioned.)

Example 12

A molecular proportion of monostearyl ethylene diamine (see aforementioned U. S. Patent No. 1,534,525) is treated with an equivalent molecular proportion of propylene oxide to yield hydroxypropyl monostearyl ethylene diamine.

Example 13

A molecular proportion of oleyl propylene diamide (sometimes referred to as oleyl propylene diamine, see aforementioned U. S. Patent No. 1,534,525), is treated with two moles of ethylene oxide to give bis(hydroxyethyl) oleyl propylene diamine (or diamide).

Example 14

Palmityl propylene diamide (or diamine), see above mentioned U. S. Patent No. 1,534,525, is treated with one mole of glycidol to give the corresponding dihydroxy propyl palmityl propylene diamide (or diamine).

Example 15

300 lbs. of castor oil fatty acids and 100 lbs. of hydroxyethylethylenediamine are heated to 200° C., to effect conversion into the corresponding amide having the following structural formula:

(See U. S. Patent No. 2,186,464, dated January 9, 1940, to Mauersberger.)

Example 16

300 lbs. by weight of castor oil and 120 lbs. by weight of hydroxypropylethylenediamine are heated to 200° C. for two hours, to effect conversion into the corresponding amide having the following structural formula:

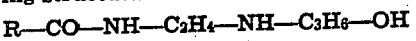

(See U. S. Patent No. 2,186,464, dated January 9, 1940, to Mauersberger.)

In view of what has been said, it is manifest that the acylated diamine of the kind herein contemplated may be indicated by the following formula:

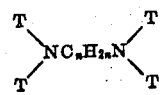

in which $n$ is a small whole number greater than 1 and preferably not greater than 10; T represents H, alkyl, alkyl-oxy-alkyl, alkylol, hydroxy-alkyl-oxy-alkyl, RCO, R'CO, RCO.OX, RCO.OX', R'CO.OX, or R'CO.OX'; in which RCO is the acyl radical derived from a higher molecular weight carboxy acid having more than 6 carbon atoms and preferably less than 40 carbon atoms; R'CO is the acyl radical derived from a lower molecular weight carboxy acid having 6 carbon atoms or less; OX is the divalent radical derived by the removal of the hydroxyl hydrogen atom from an alkylol group; and OX' is the divalent radical derived by removal of the hydroxyl hydrogen atom from a hydroxyalkyl-oxy-alkyl group; and there is the added proviso that RCO must occur at least once; and if all occurrences of RCO are limited to the amide type linkage, then there must be present at least one radical selected from the alkylol and hydroxyalkyl-oxy-alkyl class.

It is to be noted that the expression "alkyl-oxy-alkyl" is used in the hereto appended claims to indicate a radical in which the carbon atom chain is interrupted at least once by oxygen, and might be interrupted more than once, for instance, if derived from a compound obtained by the etherization of two moles of diethylene glycol. For sake of convenience, the type of compound previously described in which all occurrences of the acyl radical RCO are of the amido type will be referred to as the amide type. In such instances where the linkage occurs in the form of the radical RCO.OX and RCO.OX', as previously described, the type will be referred to as the ester type. In such instances where the types RCO and RCO.OX or RCO and RCO.OX' both appear, the type will be referred to as the ester-amide type.

Reference has been made to the introduction of an acyl radical from a lower molecular weight carboxy acid; for instance, acetic acid. Ethyl acetate could be employed for such acylation. This serves to suggest the use of a material such as chlorethyl acetate as an "alkylating" or "acylating" agent. It is well known that esters, particularly esters of the lower molecular weight alcohols and derived from lower molecular weight carboxy acids, in which an alpha-hydrogen atom has been replaced by a halogen, such as chlorine, may be used as an "acylating" agent or an "alkylating" agent. Examination reveals that the group actually introduced is not, strictly speaking, either an alkyl group or an acyl group, but is really a radical derived by the hypothetical elimination of a hydrogen atom from the carboxy ester; or it might be considered as a keto derivative. In any event, for purposes of simplicity and briefness, a radical of this particular type will be considered as an alkyl-oxy-alkyl radical, because so considered it is different only in the respect that two hydrogen atoms attached to a carbon atom have been replaced by a single oxygen atom.

In the hereto appended claims the expression "alkylol" is not intended to be limited to monohydroxy alkyl radicals, but is intended to include polyhydroxylated alkyl radicals. In addition to the various diamines which have been mentioned, it is possible to obtain diamines in which there are at least 18 carbon atoms separating the amino nitrogen atoms. Among the various diamines which are known and which have found utility in the preparation of polyamides, and particularly, synthetic linear polyamides used in the manufacture of synthetic textiles, are the following: Pentamethylene; hexamethylene; nonamethylene; decamethylene; tetramethylene; methyl hexamethylene; tridecamethylene; octadecamethylene. Such diamines are applicable in the present instance.

It is to be understood that the compounds herein contemplated may be manufactured in any suitable manner; and one is not dependent upon following the exact procedure previously outlined. In certain instances the other reactants might be employed, or else reactants of the kind previously described might be combined in some other manner. It is not intended that the hereto appended claims be limited in any manner whatsoever as to the method of manufacture, unless such method is specifically recited.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

It is to be noted that some of the compounds described are basic in character, due to the presence of an unacylated basic amino nitrogen atom, or due to the presence of an esterified group of the kind described. In such instances the compound may be employed as such, or may be employed in basic form (that is, after combination with water), or may be employed in salt form by reaction with an acid such as acetic acid, lactic acid, hydrochloric acid, or any other suitable aid.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well or at some point prior to their emergence. This particular type of application is decidedly feasible when the demulsifier is used in connection with acidification of calcareous oil-bearing strata, especially if suspended in or dissolved in the acid employed for acidification.

Since the characteristics of the hydroxyalkyl-oxy-alkyl radicals and the alkylol radicals are substantially the same in the present instance (the former representing in essence an alkyl radical interrupted at least once by oxygen), the expression "alkylol" has been employed in the hereto appended claims to include both the hydroxy-hydrocarbon type and also the hydroxylated type in which the carbon atom chain is interrupted at least once by an oxygen atom. Similarly, the expression "alkyl" in the hereto appended claims is intended to include alkyl-oxy-alkyl radicals as well.

Having thus described our invention, what we claim as new and desire to secure by Letters Patent is:

1. A process for breaking petroleum emulsions of the water-in-oil type, characterized by subjecting the emulsion to the action of a demulsifier comprising an acylated hydroxy diamine of the following formula type:

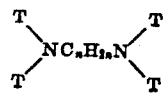

in which $n$ is a small whole number greater than 1 and not greater than 18; T represents a member of the class consisting of H, alkyl, alkylol, RCO, R'CO, RCO.OX, and R'CO.OX; in which RCO is the acyl radical derived from a higher molecular weight carboxy acid having more than 6 carbon atoms and less than 40 carbon atoms; R'CO is the acyl radical derived from a lower molecular weight carboxy acid having 6 carbon atoms or less; and OX is the divalent radical derived by the removal of the hydroxyl hydrogen atom from an alkylol group; and the said acylated hydroxy diamine is further characterized by the fact that there must be present a member of the class consisting of: (a) an acyloxy radical in which the acyl group is RCO; and (b) joint occurrence of an amido radical in which the acyl radical is RCO, and an alkylol radical.

2. A process for breaking petroleum emulsions of the water-in-oil type, characterized by subjecting the emulsion to the action of a demulsifier comprising an acylated oxyalkylated alkylene diamine in which the acyl radical is derived from a higher molecular weight carboxy acid having more than 6 carbon atoms and less than 40 carbon atoms; said alkylene radical containing at least two and not more than 18 carbon atoms; and said oxyalkyl radical containing at least two and not more than 4 carbon atoms.

3. A process for breaking petroleum emulsions of the water-in-oil type, characterized by subjecting the emulsion to the action of a demulsifier comprising an acylated oxyethylated alkylene diamine in which the acyl radical is derived from a higher molecular weight carboxy acid having more than 6 carbon atoms and less than 40 carbon atoms; said alkylene radical containing at least two and not more than 18 carbon atoms; and said oxyalkyl radical containing at least two and not more than 4 carbon atoms.

4. A process for breaking petroleum emulsions of the water-in-oil type, characterized by subjecting the emulsion to the action of a demulsifier comprising an acylated oxyethylated ethylene diamine, in which the acyl radical is derived from a higher molecular weight carboxy acid having more than six carbon atoms and less than 40 carbon atoms.

5. A process for breaking petroleum emulsions of the water-in-oil type, characterized by subjecting the emulsion to the action of a demulsifier comprising an acylated oxyethylated ethylene diamine, in which the acyl radical is derived from a detergent-forming monocarboxy acid.

6. A process for breaking petroleum emulsions of the water-in-oil type, characterized by subjecting the emulsion to the action of a demulsifier comprising an acylated oxyethylated ethylene diamine, in which the acyl radical is derived from a fatty acid having at least 8 and not more than 32 carbon atoms.

7. A process for breaking petroleum emulsions of the water-in-oil type, characterized by subjecting the emulsion to the action of a demulsifier comprising an acylated oxyethylated ethylene diamine, in which the acyl radical is derived from an unsaturated fatty acid having at least 8 and not more than 32 carbon atoms.

8. A process for breaking petroleum emulsions of the water-in-oil type, characterized by subjecting the emulsions to the action of a demulsifier comprising an acylated mono-hydroxy ethyl ethylene diamine, in which the acyl radical is a ricinoleyl radical.

9. A process for breaking petroleum emulsions of the water-in-oil type, characterized by subjecting the emulsion to the action of a demulsifier comprising an acylated bis (hydroxyethyl) ethylene diamine, in which the acyl radical is a ricinoleyl radical.

10. A process for breaking petroleum emulsions of the water-in-oil type, characterized by subjecting the emulsion to the action of a demulsifier comprising an acylated tris (hydroxyethyl) ethylene diamine, in which the acyl radical is a ricinoleyl radical.

MELVIN DE GROOTE.
BERNHARD KEISER.